United States Patent Office 2,956,987
Patented Oct. 18, 1960

2,956,987
AMINOMETHYL NORCAMPHANECARBOXYLIC ACIDS AND POLYAMIDES THEREOF

John R. Caldwell and Winston J. Jackson, Jr., Kingsport, Tenn., assignors to Eastman Kodak Company, Rochester, N.Y., a corporation of New Jersey No Drawing. Filed June 12, 1958, Ser. No. 741,467

3 Claims. (Cl. 260—78)

This invention relates to aminomethylnorcamphane carboxylic acids, to resinous polyamides thereof, and to the preparation of the same.

The new class of monomeric compounds of the invention are represented by the following general formula:

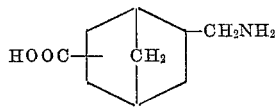

and more specifically the compounds, 2-aminomethyl-5-norcamphanecarboxylic acid and 2-aminomethyl-6-norcamphanecarboxylic acid. These monomeric compounds are valuable intermediates for the preparation of derivatives, and are further characterized by the ability to self-condense at elevated temperatures to give resinous homopolyamides characterized by the following recurring structural unit:

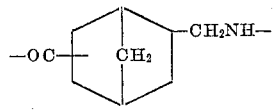

They also co-condense with each other or with other classes of amino acids to give resinous copolyamides. The resinous polyamides above described are thermoplastic materials having relatively high softening points and being capable of giving elastic fibers, flexible sheets and films and molded articles.

It is, accordingly, an object of the invention to provide novel 2-aminomethyl-5(and 6)-norcamphanecarboxylic acids. Another object is to provide resinous polyamides therefrom. Another object is to provide a process for preparing the new compounds. Other objects will become apparent hereinafter.

In accordance with the invention, we prepare our novel compounds by the following reactions:

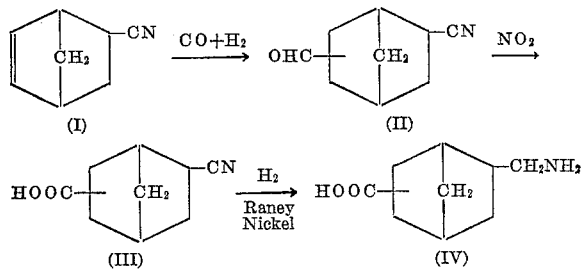

Bicyclo [2.2.1]hept-5-ene-2-carbonitrile (I) dissolved in an inert solvent such as benzene is hydroformylated with hydrogen and carbon monoxide, in the presence of a cobalt catalyst such as dicobalt octacarbonyl, at 100°–160° C., but preferably 120°–140° C., to yield the aldehyde (II) which consists of a mixture of isomers there being actually eight isomers theoretically possible, depending upon whether the aldehyde group is in the 1- or 2-position, is cis or trans to the cyano group, and the configuration is endo or exo. Oxidation to the acid (III) can be conveniently carried out in an inert solvent (such as carbon tetrachloride) with nitrogen dioxide. The preferred temperature range for a safe reaction at a reasonable rate is 25–35° C. Oxidation may also be carried out catalytically with air or chemically with silver oxide, potassium permanganate, potassium dichromate, or nitric acid. Care must be exercised in using the last three oxidizing agents since some hydrolysis of the cyano group may take place. The cyano group is then hydrogenated, using a hydrogenation catalyst such as Raney nickel, in aqueous ammonia at 25–100° C. The reaction proceeds readily at 40–60° C. Other catalysts can also be used, such as copper chromite, palladium, rutherium, rhodium, and platinum. When Raney nickel is used as the catalyst, all traces of the nickel can easily be removed by dissolving the crude product in sodium hydroxide solution, filtering off the nickel hydroxide, and passing the filtrate through an ion exchange column to recover the free amino acid. The amino acid (IV) will consist of one isomer or a mixture, depending upon the structure of the cyano acid (III). Separation of various isomers can be effected by a careful fractional distillation of the oxo product (II), by careful fractional distillation and recrystallization of the cyano acid (III), and by fractional recrystallization of the amino acid (IV).

For preparing the homopolyamides and copolyamides, the 2-aminomethyl-5-norcamphanecarboxylic acid or the 2-aminomethyl-6-norcamphanecarboxylic acid, or mixture thereof, are heated alone or with one or more other kind of amino acids or equivalents thereof, in the proportions of at least 50 mole percent of the said aminomethyl norcamphanecarboxylic acid and the remainder of the other kind of amino acid, at 200°–300° C., in an evacuated sealed tube until the condensation reaction is substantially complete, and then in vacuo at about 200–210° C., to complete the reaction and to evaporate off volatile materials. Suitable other amino acids that can be co-condensed include those represented by the following general formula:

$$H_2N—R—COOH$$

wherein R represents an alkylene group of from 5–11 carbon atoms, for example, 6-amino-n-caproic acid, 7-amino-n-heptanoic acid, 11-aminoundecanoic acid, etc.

The following examples will serve to illustrate further the manner of practicing the invention.

EXAMPLE 1

*Preparation of 2-aminomethyl-5(and 6)-norcamphanecarboxylic acid*

A solution containing 476 g. (4.0 moles) of bicyclo [2.2.1] hept-5-ene-2-carbonitrile, (I) in above reaction equations, in 2 l. of benzene was placed in an autoclave with 30 g. of dicobalt octacarbonyl. The autoclave was purged with nitrogen. Hydrogen (800 p.s.i.) was pressed in and then 1:1 hydrogen-carbon monoxide to 2,000 p.s.i. The rocking mixture was heated to 140° C. and the pressure increased to and held at 3,000 p.s.i. with 1:1 hydrogen-carbon monoxide. When no more gas was taken up, the mixture was cooled, filtered, and flash-distilled. Weight of crude product boiling at 110°–118° C./3 mm. was 408 g. (69% yield). When carefully fractionated through a 1½-inch x 60-inch vacuum jacketed column containing Podbelniak Helipak, the aldehyde distilled at 110°–128° C./4 mm. Analysis of the product gave by weight 72.34% of carbon and 7.51% of hydrogen compared with calculated for $C_5H_{11}NO$ of 72.5% and 7.4%, respectively. Accordingly, the product corresponded to a mixture of isomeric 2-cyano-5(and 6)norcamphanecarboxaldehyde corresponding to above (II) in above reaction equations. The isomers were separable by fraction distillation.

To a stirred solution of 149 g. (1.0 mole) of the isomeric mixture prepared above of 2-cyano-5(and 6)-norcamphanecarboxaldehyde (B.P. 120°–128° C./4 mm.; $n_D^{20}$ 1.4951) in 500 cc. of carbon tetrachloride was added 55 g. (1.2 moles) of nitrogen dioxide in 100 cc. of carbon tetrachloride during ½-hour. During the addition and during the next few hours the solution was occasionally briefly cooled with ice water to keep the temperature below 30° C. After the solution was allowed to stand overnight at room temperature, dry air was bubbled in to sweep out the $NO_2$. After about one hour, this was continued at 60° C. on the steam bath until the solution became yellow. The product was extracted with sodium bicarbonate solution, which was washed with ethylene dichloride and then acidified with nitric acid. The lower, oily layer of product was taken up in ethylene dichloride. This solution was washed with water and dried with sodium sulfate. The solvent was distilled off (last traces removed under vacuum). The residue was 129 g. (78% yield) of an orange sirup which became a mushy solid on standing. The neutral equivalent was 166 (calcd. value is 165). The product could be recrystallized from carbon tetrachloride, but it was used in its crude form in the next reaction. The product was a mixture of isomers of 2-cyano-5(and 6)-norcamphanecarboxylic acid corresponding to above (III) in the reaction equations. The isomers were separable by careful fractional distillation and recrystallization.

A solution containing 66 g. (0.40 mole) of the isomeric mixture prepared above of 2-cyano-5(and 6)-norcamphanecarboxylic acid (from the preceding reaction), 200 cc. of aqueous ammonia, and 300 cc. of water was placed in an autoclave with 16 g. of Raney nickel and hydrogenated at 60° C. and 1,500 p.s.i. The mixture was filtered from the catalyst and concentrated overnight on the steam bath. The blue-green residue was then dissolved in a solution containing 16.5 g. of sodium hydroxide and 200 cc. of water. After standing overnight, the mixture was filtered and passed through an ion exchange resin contained in a column. The effluent and column washings were combined, partially concentrated on the steam bath, decolorized with Darco (a decoloring charcoal), and then concentrated overnight on the steam bath. When the sirupy residue was triturated on the steam bath with ethanol, it crystallized. The mixture was cooled, and the product was collected, washed with ethanol, and dried; wt. 40 g. (59% yield). Removal of the solvent from the filtrate yielded 22 g. of a sticky material. The crystalline portion was twice recrystallized by dissolving in an equal weight of hot water and then adding hot ethanol. It melted with decomposition at 241°–242° C. Analysis gave by weight 8.2% of nitrogen compared with calculated for $C_9H_{15}NO_2$ of 8.3%. Accordingly, the product was an isomeric mixture of 2-aminomethyl-5(and 6)-norcamphanecarboxylic acids corresponding to above (IV) in the reaction equations. Part of the product mixture was subjected to fractional crystallization to separate the isomers. Another part was employed without separation of the amino acid isomers for preparing resinous polyamides.

EXAMPLE 2

*Resinous homopolyamide from 2-aminomethyl-5(and 6)-norcamphanecarboxylic acid*

The mixture of aminoacid isomers (3 g.) prepared according to Example 1 was heated with 10 drops of water for 1 hour at 240° C. in an evacuated, sealed tube. The product was dried and ground to pass a 30-mesh screen. It was then placed in a tube and heated in vacuo at 200° C. for 30 minutes and 210° C. for 3 hours. The white polyamide which was obtained had an inherent viscosity of 0.68 and melted at 230–245° C. The product could be melt-spun into elastic fibers or extruded into sheets and films. It also could be molded by injection and compression molding methods into shaped articles. The sheets were also useful as photographic film supports.

By proceeding as described in Example 2, resinous copolyamides with any of the mentioned other aminoacids can be prepared. These have generally similar properties and can also be used for the same purposes as the homopolyamide, but the latter is the most useful. If desired, all of the polyamides of the invention can be modified by incorporation therein of fillers, pigments, dyes, lubricants, plasticizers, and the like.

The invention has been described in detail with particular reference to preferred embodiments thereof, but it will be understood that variations and modifications can be effected within the spirit and scope of the invention as described hereinabove and as defined in the appended claims.

What we claim is:

1. A mixture comprising 2-aminomethyl-5-norcamphanecarboxylic acid and 2-aminomethyl-6-norcamphanecarboxylic acid.

2. A process for preparing a mixture comprising 2-aminomethyl-5-norcamphanecarboxylic acid and 2-aminomethyl-6-norcamphanecarboxylic acid which comprises treating a mixture comprising 2-cyano-5-norcamphanecarboxylic acid and 2-cyano-6-norcamphanecarboxylic acid in aqueous ammonia with hydrogen, under pressure at 25–100° C. in the presence of a hydrogenation catalyst.

3. A resinous copolyamide of a mixture of 2-aminomethyl-5-norcamphanecarboxylic acid and 2-aminomethyl-6-norcamphanecarboxylic acid having an inherent viscosity of about 0.68 and a melting point about 230–245° C.

References Cited in the file of this patent

FOREIGN PATENTS 801,331   Germany _____ Jan. 4, 1951